United States Patent [19]

Hönigschmid-Grossich et al.

[11] Patent Number: 5,482,696
[45] Date of Patent: Jan. 9, 1996

[54] METHOD FOR THE PURIFICATION AND/OR ELECTROLYSIS OF AN AQUEOUS POTASSIUM CHLORIDE SOLUTION

[75] Inventors: Rüdiger Hönigschmid-Grossich; Peter Schmittinger, both of Niederkassel; Ingo Stahl, Vellmar; Karl R. Wambach-Sommerhoff, Bad Hersfeld, all of Germany

[73] Assignee: Huels Aktiengesellschaft, Marl, Germany

[21] Appl. No.: 279,005

[22] Filed: Jul. 22, 1994

[30] Foreign Application Priority Data

Aug. 4, 1993 [DE] Germany ................. 43 26 128.0

[51] Int. Cl.⁶ ................................. C25B 15/08
[52] U.S. Cl. ................. 423/552; 210/702; 210/714; 204/98
[58] Field of Search .................... 423/551, 552; 204/98; 210/714, 724, 702

[56] References Cited

U.S. PATENT DOCUMENTS

| | | | |
|---|---|---|---|
| 3,271,106 | 9/1966 | Nylander | 423/197 |
| 3,941,667 | 3/1976 | Von Semel | 204/98 |
| 4,132,759 | 1/1979 | Schäfer | 423/161 |
| 4,261,803 | 4/1981 | Suhara | 204/98 |

FOREIGN PATENT DOCUMENTS

| | | |
|---|---|---|
| 1209562 | 8/1966 | Germany. |
| 3805266 | 8/1989 | Germany. |

OTHER PUBLICATIONS

Ullmanns Encyklopadie der technischen Chemie, vol. 9, pp. 338–340.

*Primary Examiner*—John Niebling
*Assistant Examiner*—Brendan Mee
*Attorney, Agent, or Firm*—Oblon, Spivak, McClelland, Maier & Neustadt

[57] ABSTRACT

The present invention concerns a method for the purification and/or electrolysis of an aqueous potassium chloride solution, in which the sulphate ions are removed from the aqueous potassium chloride solution by precipitation as potassium sulphate and/or as a potassium sulphate-containing salt mixture and/or as a potassium sulphate-containing compound.

13 Claims, 2 Drawing Sheets

METHOD FOR THE PURIFICATION AND/OR ELECTROLYSIS OF AN AQUEOUS POTASSIUM CHLORIDE SOLUTION

This application claims priority under 35 U.S.C. 119 to German Patent Application No. 43 26 128.0, filed in Germany on Aug. 4, 1993, which is incorporated herein by reference.

BACKGROUND OF THE INVENTION

1. Field of the Invention

The present invention relates to a method for the purification and/or electrolysis of an aqueous potassium chloride solution.

2. Discussion of the Background

The electrolysis of potassium chloride involves the use of an aqueous potassium chloride solution of high purity. To prepare the potassium chloride solution (the so-called "raw brine"), potassium chloride salt (KCl) is dissolved in water, and is then purified. The impurities introduced into the raw brine by the potassium chloride salt include calcium ions, magnesium ions, iron ions and sulphate ions, which are typically removed in precipitation and filtration processes. This typically involves adding solutions of precipitants (reagents which cause the precipitation of impurities) to the raw brine main stream or a side stream, either before or immediately after the saturation process. Magnesium and iron are precipitated as hydroxides by the addition of caustic potash solution, and calcium is precipitated as calcium carbonate by the addition of potassium carbonate.

Elevated sulphate ion concentrations (for example, >10 g/l of $SO_4^{2-}$) in the electrolysis process lead to an increase in the oxygen concentration of the the chlorine produced by electrolysis, the removal of sulphate ions from the raw brine is particularly important.

It is known to remove sulphate ions from the raw brine by precipitation as $CaSO_4$ or $CaSO_4 \cdot 2H_2O$. According to German Patent No. 12 09 562, from an alkali metal chloride brine, by addition of CaO or $Ca(OH)_2$ and $Na_2CO_3$ in a 2-step process, magnesium is precipitated as magnesium hydroxide, sulphate ions are precipitated as $CaSO_4$ or $CaSO_4 \cdot 2H_2O$ and the remaining contaminants are precipitated as carbonates.

German Patent No. 38 05 266 teaches a method for removing sulphate from alkali metal chloride brine by suspending and slaking solid CaO at a pH of 2–9 to a side stream, thus precipitating sulphate ions as $CaSO_4 \cdot 2H_2O$.

However, precipitation of sulphate ions as $CaSO_4$ or $CaSO_4 \cdot 2H_2O$ requires the use of precipitation chemicals (e.g., $CaCl_2$, $Ca(OH)_2$, etc.), thus increasing the amount of non-recoverable waste mud which has to be tipped or discarded. Moreover, the concentration of $Ca^{++}$ ions in the raw KCl brine is increased, which interferes with the electrolysis process.

A very frequently employed method for removing sulphate ions from raw KCl brine involves precipitation as barium sulphate, using barium chloride ($BaCl_2$) or barium carbonate ($BaCO_3$) as the precipitant (see "Ullmanns Encyclopädie der Technischen Chemie [Ullmann's Encyclopaedia of Industrial Chemistry]," Vol. 9, 4th ed., p. 339). This method, however, has the following drawbacks:

(1) The barium salts $BaCl_2$ and $BaCO_3$ are toxic, so that handling them requires special safety measures.

(2) Barium salts are expensive.

(3) The filter sludge generated and filtered off contains, in addition to barium sulphate, residues of undissolved barium chloride or carbonate.

(4) Inevitably, barium ions will be retained in the KCl brine after the filtration process. $BaSO_4$ precipitates are thus inevitably formed on the activated titanium anodes used in the electrolysis cell. These precipitates lead to an increase in the cell voltage required to electrolyze the KCl brine at a given current density, and thus, to increased energy costs.

(5) The operating lifetime of the titanium anodes is shortened, which results in decreased productivity (yield of product per unit time) and increased reactivation costs.

SUMMARY OF THE INVENTION

Accordingly, an object of the present invention is to provide a method for the electrolysis of an aqueous potassium chloride solution, in which sulphate ions are removed from the potassium chloride solution in a particularly economical and environmentally compatible manner.

A further object of the present invention is to provide a method for the electrolysis of an aqueous potassium chloride solution, in which the amount of non-recoverable waste mud which has to be discarded is decreased.

A further object of the present invention is to provide a method for the electrolysis of an aqueous potassium chloride solution, in which the concentration of $Ca^{++}$ ions in the raw KCl brine is decreased.

A further object of the present invention is to provide a method for the electrolysis of an aqueous potassium chloride solution, in which the use of barium salt precipitants is avoided.

A further object of the present invention is to provide a method for the electrolysis of an aqueous potassium chloride solution which prolongs the lifetime and increases the productivity of the electrolysis apparatus.

A further object of the present invention is to provide a method for the purification of an aqueous potassium chloride solution, in which the amount of non-recoverable waste mud which has to be discarded is decreased, in which the concentration of $Ca^{++}$ ions in the raw KCl brine is decreased, which increases the lifetime and productivity of an electrolysis apparatus and which avoids the use of barium salt precipitants.

A further object of the present invention is to provide a method for the purification of an aqueous potassium chloride solution which removes sulphate ions from the potassium chloride solution in a particularly economical and environmentally compatible manner.

These and other objects, which will become apparent during the following detailed description of the preferred embodiments, are provided by the present invention, which concerns a method of purifying and/or electrolyzing an aqueous potassium chloride solution, comprising precipitating sulphate ions in aqueous potassium chloride solution as potassium sulphate, as a potassium sulphate-containing salt mixture, as a potassium sulphate-containing compound, or as any mixture thereof.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
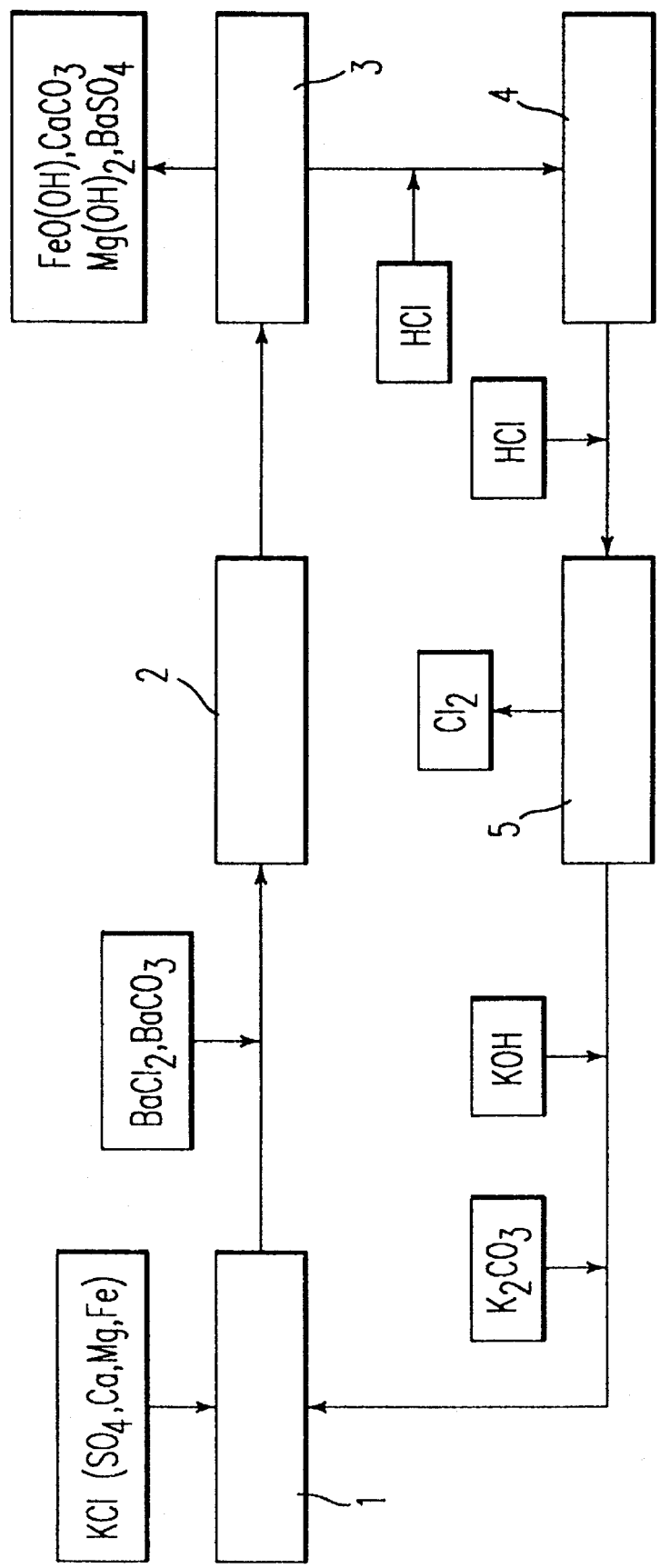
FIG. 1 depicts, by way of example, the potassium chloride brine circuit and treatment steps of a potassium chloride electrolysis procedure according to a prior amalgam process.

The present Inventors have found that, surprisingly, sulphate ions can be removed from an aqueous potassium chloride solution by precipitation as potassium sulphate and/or as a potassium sulphate-containing salt mixture and/or as a potassium sulphate-containing compound, in a particularly economical and environmentally compatible manner.

The present invention concerns a method of purifying or electrolyzing an aqueous potassium chloride solution, comprising removing sulphate ions from the aqueous potassium chloride solution by precipitating the sulphate ions as potassium sulphate and/or as a potassium sulphate-containing salt mixture and/or as a potassium sulphate-containing compound. In the present method, sulphate ions in an aqueous potassium chloride solution can be precipitated by treating the solution with one or more reagents (preferably, by adding the reagent(s) to the solution) which precipitate potassium sulphate, a potassium sulphate-containing salt mixture, a potassium sulphate-containing compound, or a mixture thereof.

In one aspect of the present method, sulphate ions in an aqueous potassium chloride solution are precipitated by increasing the hydroxide ion and/or carbonate ion concentration of the aqueous potassium chloride solution. Preferably, the hydroxide ion and/or carbonate ion concentration of the aqueous potassium chloride solution is increased by adding potassium hydroxide and/or potassium carbonate to the aqueous potassium chloride solution. Potassium hydroxide and potassium carbonate can be added to the aqueous potassium chloride solution either in solid form or as an aqueous solution, or as both in solid form and as an aqueous solution (e.g., as a slurry). The addition of an aqueous solution is preferred.

Preferably, the ratio of the amount of potassium chloride present in the aqueous potassium chloride solution to the amount of potassium hydroxide to be added to the aqueous potassium chloride solution is from 8:1 to 2:1, particularly preferably from 4:1 to 2.5:1 by weight. For the addition of potassium carbonate, the ratio of the amount of potassium chloride present in the aqueous potassium chloride solution to the amount of potassium carbonate to be added to the aqueous potassium chloride solution is preferably from 2.5:1 to 5:1, particularly preferably from 3:1 to 4.5:1 by weight.

In another aspect of the present method, sulphate ions are precipitated by increasing the concentration of either hydrogen carbonate ion alone, or of both hydrogen carbonate and carbonate ion, in the aqueous potassium chloride solution, preferably by adding potassium hydrogen carbonate or a mixture of potassium hydrogen carbonate and potassium carbonate to the aqueous potassium chloride solution. Potassium hydrogen carbonate, or optionally, in a mixture with potassium carbonate, can be added to the aqueous potassium chloride solution either in solid form or as an aqueous solution, or both in solid form and as an aqueous solution (e.g., a slurry). The addition of $KHCO_3$, alone or admixed with $K_2CO_3$, in solid form is preferred.

The precipitation of the potassium sulphate, potassium sulphate-containing salt mixture, potassium sulphate-containing compound or mixture thereof can also be assisted by the addition of further precipitants. Preferably, one further additional precipitant added is calcium chloride. The ratio of the amount of potassium chloride in the aqueous potassium chloride solution to the amount of calcium chloride added is from 50:1 to 10:1 by weight. It is also advantageous to add potassium sulphate seed crystals to the aqueous potassium chloride solution, to aid the precipitation of the potassium sulphate, potassium sulphate-containing salt mixture, potassium sulphate-containing compound or mixture thereof.

As a rule, the precipitated potassium sulphate, potassium sulphate-containing salt mixture, potassium sulphate-containing compound or mixture thereof separates in crystalline form, and is readily filtered off. The temperature of the aqueous potassium chloride solution during precipitation should suitably be above the saturation temperature of potassium chloride, to minimize coprecipitation of potassium chloride. The solubility of KCl increases with temperature, as follows:

TABLE 1

| Temperature (°C.) | 20 | 40 | 60 | 80 |
|---|---|---|---|---|
| Solubility (g KCl/100 g $H_2O$) | 34.4 | 40.3 | 45.6 | 51.0 |

For a constant ratio of potassium chloride in the aqueous solution to potassium hydroxide being added thereto, the purity of the precipitated potassium sulphate increases with increasing precipitation temperature (i.e., the coprecipitation of potassium chloride decreases at a higher precipitation temperature). However the yield of potassium sulphate precipitated drops slightly at a higher precipitation temperature. Accordingly, to achieve good yields of precipitated potassium sulphate, a smaller ratio of potassium chloride to potassium hydroxide should be used at a higher precipitation temperature.

For example, at a KCl:KOH ratio of 3:1 by weight, the yield of potassium sulphate increases from 26% to 43% by lowering the precipitation temperature from 45° C. to 39° C. Furthermore, if the precipitation process is conducted at a temperature of 36° C. instead of 40° C., it is possible to increase the KCl:KOH ratio from 2.7:1 to 3.0:1 to provide the same yield of potassium sulphate.

The present method is suitable for use in the electrolysis of potassium chloride according to the amalgam process, the diaphragm process or the membrane process, each of which is conventional, and known to those of ordinary skill in the art. Accordingly, the present method also concerns a method of electrolyzing an aqueous potassium chloride solution according to an amalgam process, a diaphragm process or a membrane process, the improvement comprising purifying the aqueous potassium chloride solution by precipitating sulphate ions as potassium sulphate and/or as a potassium sulphate-containing salt mixture and/or as a potassium sulphate-containing compound. In the present improved electrolysis method, sulphate ions can be precipitated by increasing the hydroxide ion and/or carbonate ion concentration of the aqueous potassium chloride solution, by increasing the concentration of hydrogen carbonate ion alone or in combination with the concentration of carbonate ion, by adding one or more further precipitants, or by any combination thereof, as described above for the present method of electrolysis.

In the prior amalgam process shown in FIG. 1, solid potassium chloride containing calcium, magnesium, iron and sulphate impurities is dissolved in depleted brine or in water in a salt dissolver 1, the so-called "raw brine" being obtained. The raw brine is now mixed with barium chloride or barium carbonate, and in the precipitation vessel 2, the impurities are precipitated. With the aid of a filter 3, a precipitate consisting of iron hydroxide, magnesium hydroxide, calcium carbonate and barium sulphate is filtered off. The filtrate (purified potassium chloride brine) is then mixed with hydrochloric acid, and passed to the electrolysis apparatus 4. Downstream of the electrolysis apparatus 4, the so-called "depleted brine" is obtained, which is acidified with hydrochloric acid, and then passed to the dechlorination apparatus 5. The dechlorinated, depleted brine is then mixed with potassium hydroxide and potassium carbonate, and returned to the salt dissolver 1, thus closing the potassium chloride brine circuit. Optionally, potassium hydroxide and potassium carbonate may be added to the raw brine downstream of the salt dissolver 1.

In a preferred aspect of the present method, sulphate ions are removed by precipitation as potassium sulphate, as a potassium sulphate-containing salt mixture, as a potassium sulphate-containing compound, or as a mixture thereof, from the depleted brine. The term "depleted brine" refers to the potassium chloride brine obtained after electrolysis, having a lower potassium chloride concentration than the raw brine.

Particularly preferably, sulphate ions are removed from a side stream of the depleted brine by precipitation and filtration. In the present method, the potassium hydroxide added to the aqueous potassium chloride solution for the precipitation of the ions precipitable as hydroxides (e.g., Mg and Fe ions) may be added in part or as a whole to a side stream of the depleted brine.

For example, potassium hydroxide in solid or dissolved form, and if desired, potassium carbonate, can be added to a side stream of the depleted brine at a precipitation temperature from 30° to 50° C. The amount of potassium hydroxide added is preferably sufficient to provide a ratio of potassium chloride to potassium hydroxide from 8:1 to 2:1 by weight. Thus, for a depleted brine having a content of from approximately 20 to 25% by weight of potassium chloride and from approximately 1.5 to 2% by weight of potassium sulphate, KOH and $K_2CO_3$ are added. With slow stirring, and optionally with the addition of potassium sulphate crystals as crystallization nuclei, the potassium sulphate precipitates, and is filtered off. The filtrate, an alkalinized depleted brine, may then be added back into the main stream of the depleted brine in a controlled manner. If desired, the pH of the main stream of the depleted brine can then be adjusted (preferably by further addition of potassium hydroxide) to a value of from 8 to 12.5. This pH range is required for the precipitation of Mg ions and Fe ions in all electrolysis processes.

Figure 2:
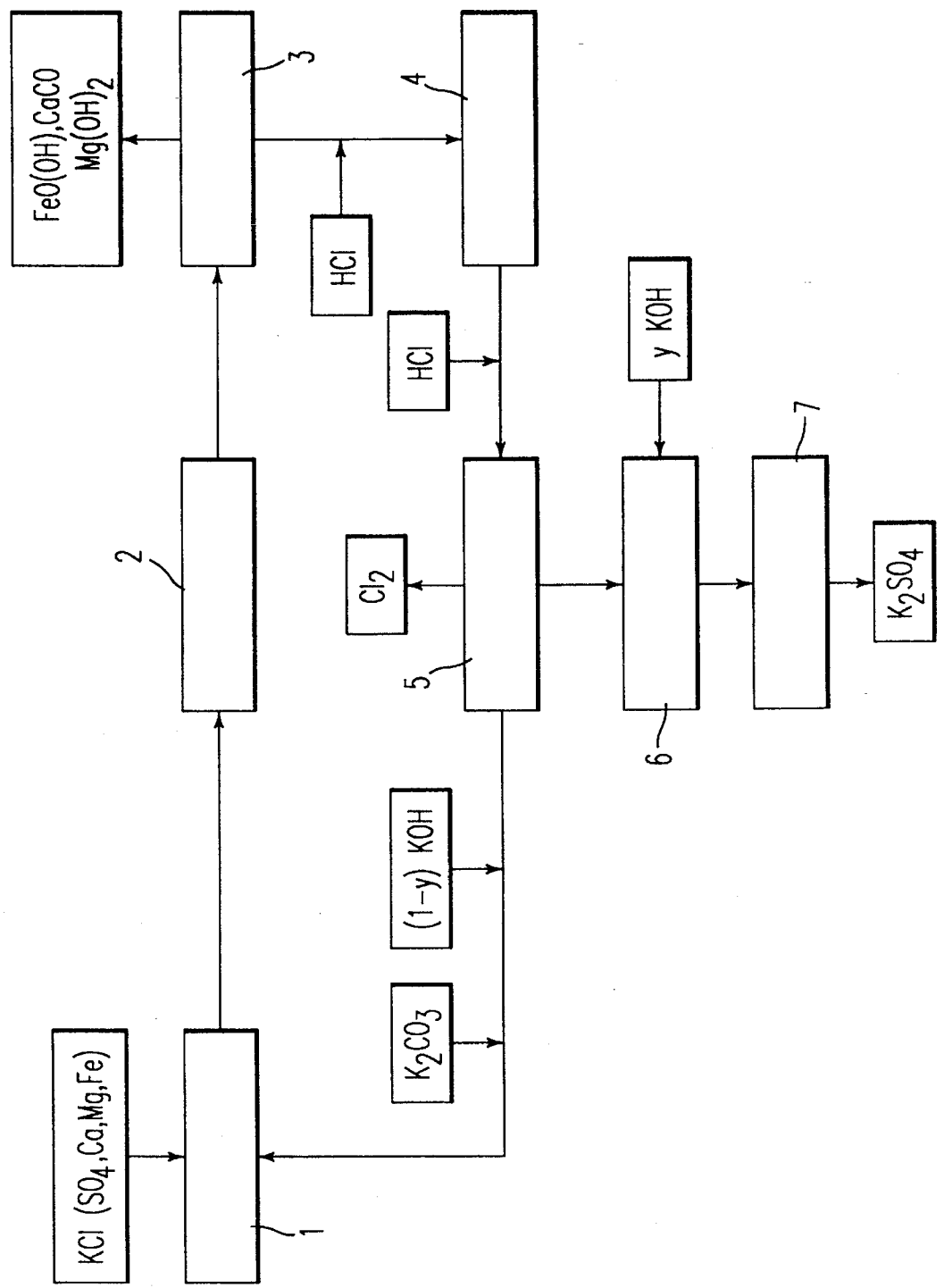
FIG. 2 depicts, by way of example, the potassium chloride brine circuit and treatment steps of an embodiment of the present potassium chloride purification/electrolysis process, in accordance with an amalgam process, in which sulphate ions are removed from a side stream of the depleted KCl brine.

FIG. 2 depicts, by way of example, the potassium chloride brine circuit of an embodiment of the present potassium chloride electrolysis process, in accordance with an amalgam process. The sulphate ions are removed from a side stream of the depleted brine by precipitation as potassium sulphate.

In contrast to prior methods, the raw brine in the present method is mixed neither with barium chloride nor with barium carbonate. Therefore, the precipitate generated by the present method does not contain any barium sulphate.

In one embodiment of the present method, a side stream of the depleted brine is branched off from the main stream of the depleted brine downstream of the dechlorination apparatus 5. The depleted brine in the side stream is mixed in a precipitation vessel 6 with an aliquot of the amount of potassium hydroxide which results in the precipitation of the ions precipitable as hydroxides (e.g., Mg and Fe ions). This aliquot or proportion of potassium hydroxide used in the precipitation step is equal to a number y, where $y \leq 1$. The precipitated potassium sulphate is then filtered off with the aid of a filter 7, and the filtrate is recycled into the main stream of the depleted brine. The depleted brine is then mixed with potassium carbonate and the remaining amount (1-y) of potassium hydroxide used for the precipitation of the hydroxide-based preciptates, and is returned to the salt dissolver 1, thus closing the potassium chloride brine circuit. Optionally, the remaining potassium hydroxide and potassium carbonate may be added to the raw brine downstream of the salt dissolver 1.

With the aid of the present method, it is possible to discharge readily up to approximately 80% of the potassium sulphate originally contained in the side stream of the depleted brine. In each case, as much potassium sulphate can be removed as is introduced by the raw material potassium chloride into the potassium chloride brine circuit of the potassium chloride electrolysis process.

The present method has the following advantages compared to prior methods:

(1) Expensive precipitants (e.g. barium salts) are avoided.
(2) Handling of toxic barium salts is avoided.
(3) The average cell voltages are reduced during electrolysis, and energy is thus saved.
(4) The anode operating times of the electrolysis cells are extended.
(5) The separate discharge of precipitated, crystallized potassium sulphate (a valuable substance) permits its subsequent utilization in other processes for which it is useful (for example, in fertilizing plants and crops).
(6) The amount of filter sludge produced in the present process is decreased, which leads to reduced wastes generated and a savings in tipping costs.
(7) The filter sludge is free of barium salts, which constitutes a major contribution to the protection of the environment.

Other features of the present invention will become apparent in the course of the following descriptions of exemplary embodiments which are given for illustration of the invention, and are not intended to be limiting thereof.

EXAMPLE 1

Potassium chloride-depleted brine (1.5 m³, corresponding to 1,742 kg), having a pH of 10.5–11, a KCl content of 23.3% by weight and a $K_2SO_4$ content of 1.78% by weight, is branched off as a side stream from a main stream of depleted brine discharged from a potassium chloride electrolysis apparatus. The depleted brine in the side stream is mixed in a precipitation vessel with 243 kg of 49.6% by weight caustic potash solution (aqueous KOH) at a temperature of 50° C. The ratio of KCl to KOH is 3.37 to 1 by weight. After addition of $K_2SO_4$ seed crystals, the mixture is cooled with stirring to a precipitation temperature of 35° C., and the precipitated $K_2SO_4$ crystals are filtered off. Subsequent cooling to a temperature of 29° C. results in a secondary precipitation takes place in the filtrate. The secondary precipitate is filtered off and combined with the first $K_2SO_4$ precipitate. The amount of the caustic potash added is virtually completely recovered in the filtrate obtained. The filtrate is fed back to the depleted brine main stream.

The total amount of precipitate is 9.97 kg. The gross composition of the precipitate is 95.8% by weight of $K_2SO_4$, 1.3% by weight of KCl, and the remainder water. The yield of 9.55 kg of $K_2SO_4$ corresponds to 30.8% of the amount of $K_2SO_4$ originally contained in the side stream of the depleted brine.

Example 1 demonstrates that $K_2SO_4$ can be obtained from the depleted brine in very pure form.

EXAMPLE 2

Potassium chloride-depleted brine (1.5 m$^3$, corresponding to 1,753 kg), having a pH of 10.5–11, a KCl content of 23.8% by weight and a $K_2SO_4$ content of 1.69% by weight, is branched off as a side stream from a main stream of depleted brine discharged from a potassium chloride electrolysis apparatus. The depleted brine in the side stream is mixed in a precipitation vessel with 311 kg of 50% by weight caustic potash solution (aqueous KOH) at a temperature of 50° C. The ratio of KCl to KOH is 2.7 to 1 by weight. After addition of $K_2SO_4$ seed crystals, the mixture is cooled with stirring to a precipitation temperature of 32° C., and the precipitated $K_2SO_4$ crystals are filtered off. Subsequent cooling to a temperature of 29° C. results in a secondary precipitation takes place in the filtrate. The secondary precipitate is filtered off and combined with he first $K_2SO_4$ precipitate. The amount of the caustic potash added is virtually completely recovered in the filtrate obtained. The filtrate is fed back to the depleted brine main stream.

The amount of precipitate is 54.8 kg. The gross composition of the precipitate is 27.94% by weight of $K_2SO_4$, 67.07% by weight of KCl, and the remainder water. The yield of 15.31 kg of $K_2SO_4$ corresponds to 51.7% of the amount of $K_2SO_4$ originally contained in the side stream of the depleted brine.

Example 2 demonstrates that the $K_2SO_4$ can be obtained from a thin brine in high yield.

EXAMPLE 3

Potassium chloride-depleted brine (1.5 m$^3$, corresponding to 1,741 kg), having a pH of 10.5–11, a KCl content of 23.2% by weight and a $K_2SO_4$ content of 1.74% by weight, is branched off as a side stream from a main stream of depleted brine discharged from a potassium chloride electrolysis apparatus. The depleted brine in the side stream is mixed in a precipitation vessel with 303 kg of 49.6% by weight caustic potash solution (aqueous KOH) at a temperature of 50° C. The ratio of KCl to KOH is 2.7 to 1 by weight. After addition of $K_2SO_4$ seed crystals, the mixture is cooled with stirring to a precipitation temperature of 37° C., and the precipitated $K_2SO_4$ crystals are filtered off. The filtrate is held at a temperature of approximately 38° C., and a small amount of secondary precipitate crystallizes out, which is combined with the first $K_2SO_4$ precipitate. The amount of the caustic potash added is virtually completely recovered in the filtrate obtained. The filtrate is fed back to the depleted brine main stream.

The total amount of precipitate is 12.1 kg. The gross composition of the precipitate is 98.84% by weight of $K_2SO_4$, 0.99% by weight of KCl, and the remainder water. The yield of 11.96 kg of $K_2SO_4$ corresponds to 39.4% of the amount of $K_2SO_4$ originally contained in the side stream of the depleted brine.

Example 3 demonstrates that $K_2SO_4$ can be obtained from a depleted brine in very pure form, and at the same time, in a relatively high yield.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A method of purifying an aqueous potassium chloride solution containing sulphate ions as impurities, comprising precipitating said sulphate ions from said solution as potassium sulphate, a potassium sulphate-containing salt mixture, a potassium sulphate-containing compound, or a mixture thereof, said precipitating comprising one of groups (a), (b) and (c):

(a) increasing the concentration of hydroxide ion, carbonate ion, or both, in said solution;

(b) increasing either the concentration of hydrogen carbonate ion or the concentration of both hydrogen carbonate and carbonate ion in said solution; or (c) adding potassium sulphate seed crystals to said solution.

2. The method according to claim 1, wherein said precipitating is selected from group (a) and comprises adding potassium hydroxide, potassium carbonate, or a mixture thereof, to said solution.

3. The method according to claim 1, wherein said precipitating is selected from group (b) and comprises adding potassium hydrogen carbonate or a mixture of potassium hydrogen carbonate and potassium carbonate to said solution.

4. The method according to claim 1, wherein said precipitating is selected from group (c).

5. The method according to claim 1, further comprising adding one or more additional precipitants.

6. The method according to claim 5, wherein said additional precipitant is calcium chloride.

7. The method according to claim 1, wherein said aqueous potassium chloride solution has a temperature during said precipitating which is above the saturation temperature of potassium chloride.

8. The method according to claim 1, wherein said aqueous potassium chloride solution is a depleted brine, and said method further comprises removing said potassium sulphate, potassium sulphate-containing salt mixture, potassium sulphate-containing compound or mixture thereof from said depleted brine.

9. The method according to claim 8, wherein said potassium sulphate, potassium sulphate-containing salt mixture, potassium sulphate-containing compound or mixture thereof is removed from a side stream of the depleted brine.

10. The method according to claim 2, wherein potassium hydroxide is added and the potassium chloride contained in the aqueous potassium chloride solution and the potassium hydroxide are present in a ratio of 8:1 to 2:1 by weight.

11. The method according to claim 1, further comprising the step of filtering said potassium sulphate, potassium sulphate-containing salt mixture, potassium sulphate-containing compound or mixture thereof.

12. The method according to claim 1, further comprising the step of electrolyzing said aqueous potassium chloride solution.

13. The method according to claim 12, wherein the step of electrolyzing is carried out according to an amalgam process, a diaphragm process, or a membrane process.

* * * * *